UNITED STATES PATENT OFFICE.

CHARLES NICHOLAS MERIWETHER, OF CLARKSVILLE, TENNESSEE.

PHOSPHATE AND THE METHOD OF MAKING SAME.

1,016,352.  Specification of Letters Patent.  Patented Feb. 6, 1912.

No Drawing.  Application filed July 9, 1908. Serial No. 442,757.

*To all whom it may concern:*

Be it known that I, CHARLES N. MERI-WETHER, a citizen of the United States, residing at Clarksville, in the county of Montgomery and State of Tennessee, have invented a new and useful Phosphate and the Method of Making Same, of which the following is a specification.

This invention relates to phosphates and method of making same.

There exists in the United States large quantities of neutral or natural phosphates as mineral and as bones, but owing to the fact that these are tri-basic neutral phosphates of lime, or of aluminum or iron, or are a mixture of these and sand, they are poor fertilizers as they are but mildly conducive in promoting the growth of plants. Furthermore, owing to the refractory character of these materials, it is practically impossible to fuse them without the employment of specially constructed and highly expensive machinery for the purpose.

It is the object of the present invention to render it possible at comparatively low cost, and with any ordinary furnace adapted for the purpose, readily and expeditiously to fuse such natural phosphates and to reduce or disintegrate them to a degree of fineness that will best adapt them for use.

With the above and other objects in view, as will appear as the nature of the invention is better understood, the same consists, generally stated, in the method of treating natural phosphates to render them valuable as fertilizers, which resides in mixing such phosphates with an alkaline material, such as carbonate or fluorid of lime, and then subjecting the mixture to the action of heat to fuse the mass.

The invention consists further in a fertilizer consisting of fused natural phosphates and an alkaline material.

In carrying the invention into effect, natural phosphatic material, either of mineral or bone formation, is mixed with an alkaline material that will render the fusing of the rock an easy matter, such as carbonate or fluorid of lime, and the mass is then subjected to sufficient heat to fuse it, and while in a molten condition is run into water, thereby causing the compound to disintegrate into grains. These are then ground in a suitable mill to the desired degree of fineness to fit the substance for use as a fertilizer.

To enhance the fertilizing properties of the compound, potash-granite or magnesia may be added, and these will take the place of the lime in proportion to the potash or magnesia they contain. The amounts of these materials added to the phosphatic substance will depend upon the quantity of phosphatic and silicic acids the rock contains.

It is of course known that the admixture of neutral phosphates and an alkaline base combined with another acid, as for example, neutral tri-basic phosphate of lime and neutral carbonate of lime, sometimes exists in the natural state, but not generally in the right proportions, so that the substance is not a fertilizer and will not become one until subjected to heat to drive off the weak acid, whereupon a new compound which is alkaline is produced, which is an active plant food.

I have found by actual experience that while certain natural phosphate rocks will contain about 80% of phosphate of lime and 20% of silica, iron, and alumina, other natural phosphate rocks, which may possibly be found in the same locality as the rock mentioned above, will contain about 40% of phosphate of lime to 50% of carbonate of lime and about 10% of aluminum and iron. Now the object of my invention is to change the condition of the rock so as to render it desirable for use as a fertilizer and to accomplish this change in condition in the cheapest and most convenient manner. To do this I first compound such mixtures of phosphate rock at my command or add to any available grade of such rock sufficient carbonate of lime so that the resulting mixture shall contain more than enough lime to satisfy all of the phosphate acid and to an excess of about one-fourth. Having secured such a mixture, the same is heated to a temperature of about 1450° centigrade at which temperature it will readily be fused, whereupon chemical reaction will take place resulting in the phosphate fertilizer embodying my invention. It will be noted that my process of manufacture does not contemplate the use of silica as an ingredient and the use of this substance is avoided principally for the reason that while by its use the rock may be fused at a lower temperature, practically all of the phosphate acid will be driven off thereby detracting from rather than adding to the quality of the fertilizer.

I claim:—

As a new article of manufacture, a fertilizer consisting of phosphatic material having an excess of lime, an alkaline substance and magnesia fused together and reduced to a powdered condition.

In testimony that I claim the foregoing as my own, I have hereto affixed my signature in the presence of two witnesses.

CHARLES NICHOLAS MERIWETHER.

Witnesses:
W. M. PONDER,
W. J. DICKERSON.